United States Patent
Buchmann et al.

(10) Patent No.: US 10,840,822 B2
(45) Date of Patent: Nov. 17, 2020

(54) CONTROL OF MMC DURING FAULT

(71) Applicant: ABB Schweiz AG, Baden (CH)

(72) Inventors: Beat Buchmann, Baden (CH); Cosmin Banceanu, Muri AG (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/624,187

(22) PCT Filed: Jun. 21, 2017

(86) PCT No.: PCT/EP2017/065240
§ 371 (c)(1),
(2) Date: Dec. 18, 2019

(87) PCT Pub. No.: WO2018/233824
PCT Pub. Date: Dec. 27, 2018

(65) Prior Publication Data
US 2020/0177098 A1    Jun. 4, 2020

(51) Int. Cl.
*H02M 7/483*    (2007.01)
*H02J 3/00*    (2006.01)
(Continued)

(52) U.S. Cl.
CPC ............. *H02M 7/483* (2013.01); *B60M 3/02* (2013.01); *H02J 3/00125* (2020.01);
(Continued)

(58) Field of Classification Search
CPC ................... H02M 7/483; H02M 1/32; H02M 2001/0025; H02M 2007/4835; B60M 3/02; H02J 3/00125
See application file for complete search history.

(56) References Cited

U.S. PATENT DOCUMENTS 9,130,458 B2 * 9/2015 Crookes ................ H02J 3/1835
2012/0092906 A1    4/2012 Hasler
(Continued)

FOREIGN PATENT DOCUMENTS

EP    2 595 265 A1    5/2013

OTHER PUBLICATIONS

International Search Report, issued in PCT/EP2017/065240, dated Oct. 4, 2017.
(Continued)

*Primary Examiner* — Kyle J Moody
(74) *Attorney, Agent, or Firm* — Slater Matsil, LLP

(57) ABSTRACT

A method of controlling a Modular Multilevel Converter (MMC) during a fault in a power grid to which the MMC is connected is disclosed. The MMC includes a plurality of phases, each including at least one phase leg. Each phase leg includes a plurality of series connected converter cells. The method includes determining that a fault has occurred in the power grid, the fault including a reduced voltage in the power grid. The method also includes, for each phase leg of the MMC, reducing the DC voltage of the phase leg by a predetermined amount from a nominal DC voltage to a reduced DC voltage, the DC voltage being the sum of all respective voltages over an energy storage of each cell of the phase leg. The method also includes determining that the fault has been cleared, whereby the voltage in the power grid is returned to nominal. The method also includes for each of the phase legs of the MMC, increasing the DC voltage back to the nominal DC voltage.

20 Claims, 3 Drawing Sheets

(51) Int. Cl.
*B60M 3/02* (2006.01)
*H02M 1/32* (2007.01)
*H02M 1/00* (2006.01)

(52) U.S. Cl.
CPC ...... *H02M 1/32* (2013.01); *H02M 2001/0025* (2013.01); *H02M 2007/4835* (2013.01)

(56) References Cited

U.S. PATENT DOCUMENTS

2015/0069980 A1   3/2015  Gambach et al.
2019/0288509 A1*  9/2019  Buchmann ............. H02M 1/32

OTHER PUBLICATIONS

Li et al., "Thyristor Based Modular Multilevel Converter with Active Full-bridge Chain-link for Forced Commutation", 2016 IEEE 17th Workshop on Control and Modeling for Power Electronics (COMPEL), IEEE, Jun. 27, 2016, pp. 1-6, XP032955267.
Written Opinion of the International Searching Authority, issued in PCT/EP2017/065240, dated Oct. 4, 2017.

* cited by examiner

CONTROL OF MMC DURING FAULT

TECHNICAL FIELD

The present disclosure relates to a controlling an MMC during a fault in a power grid to which the MMC is connected.

BACKGROUND

A Modular Multilevel Converter (MMC), also known as Chain-Link Converter (CLC), comprises a plurality of converter cells, also called converter sub-modules, serially connected (cascaded, chain-linked) in converter branches, also called phase legs or arms, that in turn may be arranged in a star (Y, wye), delta, direct or indirect converter topology. Each converter cell comprises semiconductor switches, in a topology forming a half-bridge (monopolar) or full-bridge (bipolar, H-bridge) circuit with a capacitor for storing energy. Semiconductor switches such as insulated gate bipolar transistor (IGBT) devices, gate-turn-off thyristor (GTO) devices, integrated gate commutated thyristor (IGCT) devices, or metal-oxide-semiconductor field-effect transistor (MOSFET) devices may be used for connecting the capacitor to the converter branch with one or two polarities. MMCs may be used in electric power transmission and generation systems such as static synchronous compensator (STATCOM), Railway Interties, Pumped Hydro and High Voltage Direct Current (HVDC) transmission. For Railway Interties and Pumped Hydro both direct and indirect topology can be used.

In e.g. Railway Intertie applications, there are requirements regarding fault ride through, especially on the 1-phase side. If there is a grid failure which causes a grid voltage drop, the converter is not allowed to stop pulses and is required to inject short circuit current immediately after the grid fault is initiated. The converter has to supply the short circuit current during the whole fault. At the time instant where the fault in the grid is cleared, the grid voltage jumps from the fault voltage to approximately the former operational voltage. The converter has to stay in operation during and after this transition.

Then, depending on the phase angle when the alternating current (AC) voltage recovers and the height of the AC voltage step, there may be a problem that the DC voltages in the MMC cells can increase fast and reach the overvoltage protection level in the respective cells. This may lead to a converter main breaker trip and therefore to an interruption of the power transfer, which is undesirable.

SUMMARY

It is an objective of the present invention to provide a method of controlling an MMC during fault in the grid voltage to reduce the risk of DC overvoltage in the respective converter cells when the grid voltage returns to nominal.

According to an aspect of the present invention, there is provided a method of controlling an MMC during a fault in a power grid to which the MMC is connected. The MMC comprises a plurality of phases, each phase comprising at least one phase leg. Each phase leg comprises a plurality of series connected converter cells. The method comprises determining that a fault has occurred in the power grid, said fault including a reduced voltage in the power grid. The method also comprises, for each phase leg of the MMC, reducing the DC voltage of the phase leg by a predetermined amount from a nominal DC voltage to a reduced DC voltage, the DC voltage being the sum of all respective voltages over an energy storage of each cell of the phase leg. The method also comprises determining that the fault has been cleared, whereby the voltage in the power grid is returned to nominal. The method also comprises for each of the phase legs of the MMC, increasing the DC voltage back to the nominal DC voltage.

According to another aspect of the present invention, there is provided a computer program product comprising computer-executable components for causing a control arrangement of an MMC to perform an embodiment of a method of the present disclosure when the computer-executable components are run on processing circuitry comprised in the control arrangement.

According to another aspect of the present invention, there is provided a control arrangement for controlling an MMC during a fault in a power grid to which the MMC is connected. The MMC comprises a plurality of phases, each phase comprising at least one phase leg, wherein each phase leg comprises a plurality of series connected converter cells. The control arrangement comprises processing circuitry, and data storage storing instructions executable by said processing circuitry whereby said control arrangement is operative to determine that a fault has occurred in the power grid, said fault including a reduced voltage in the power grid. The control arrangement is also operative to, for each phase leg of the MMC, reduce the DC voltage of the phase leg by a predetermined amount from a nominal DC voltage to a reduced DC voltage, the DC voltage being the sum of all respective voltages over an energy storage of each cell of the phase leg. The control arrangement is also operative to determine that the fault has been cleared, whereby the voltage in the power grid is returned to nominal. The control arrangement is also operative to, for each of the phase legs of the MMC, increase the DC voltage back to the nominal DC voltage.

Embodiments of the invention are intended to be used in MMCs. The MMC is used in different applications like STATCOM, Railway Interties, Pumped Hydro and HVDC transmission. These applications have normally strong requirements regarding fault ride through.

One situation which may be difficult to handle is when the grid voltage recovers after a fault (e.g. a voltage step from 10% to 100% of nominal voltage). In this case the converter could suffer from overvoltages in the cells and, as a consequence, the converter has to stop operation (pulse block or even opening the main circuit breaker).

A feature of the present invention is that the DC voltage of the cells is reduced (e.g. by 10%) during the fault in order to increase the margin between actual DC voltage and the overvoltage protection level. This reduces or even eliminates the risk that converter operation has to be stopped after a fault in the grid is cleared.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
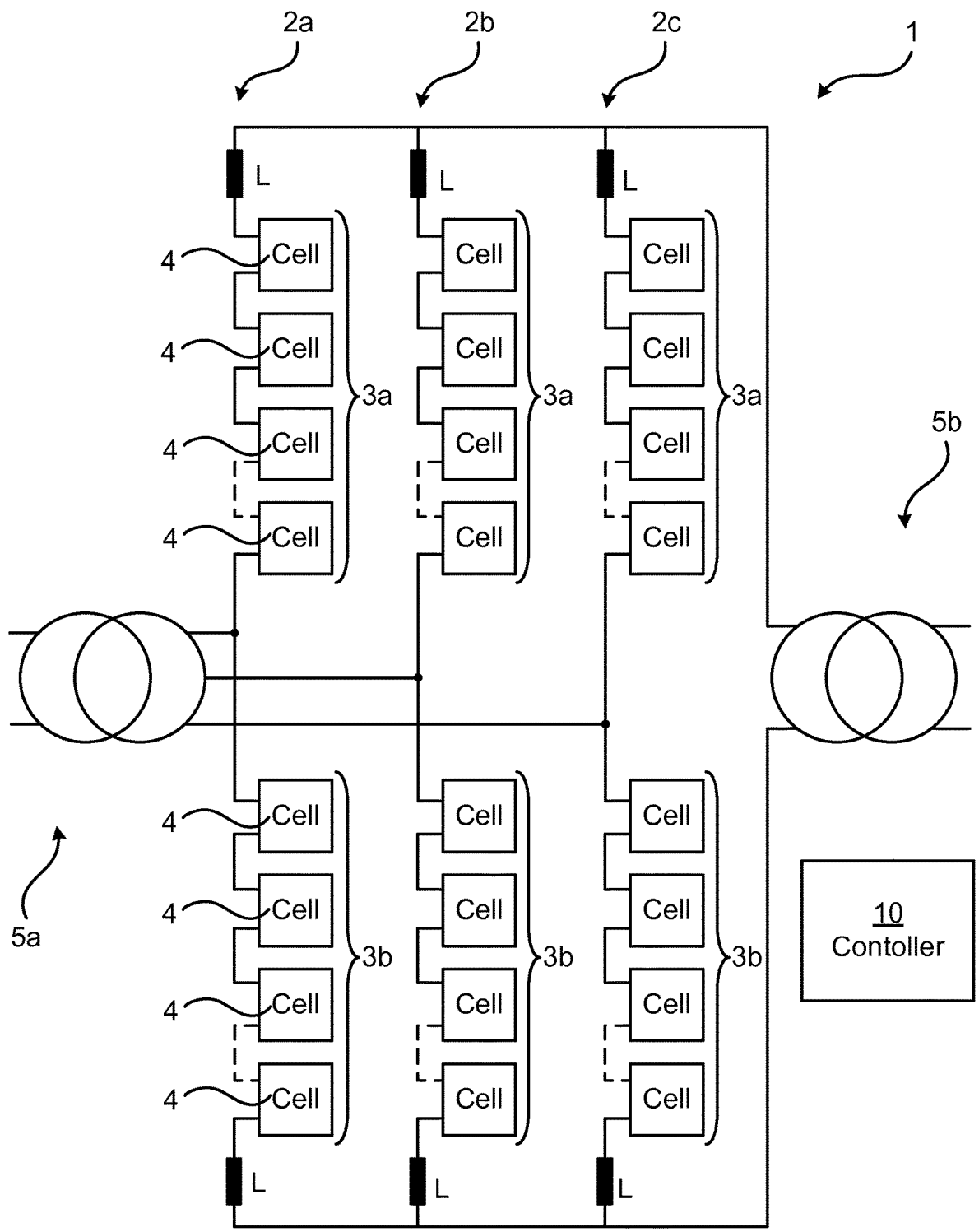
FIG. 1 is a schematic circuit diagram of an embodiment of an MMC in double-wye configuration, in accordance with the present invention.
Figure 2:
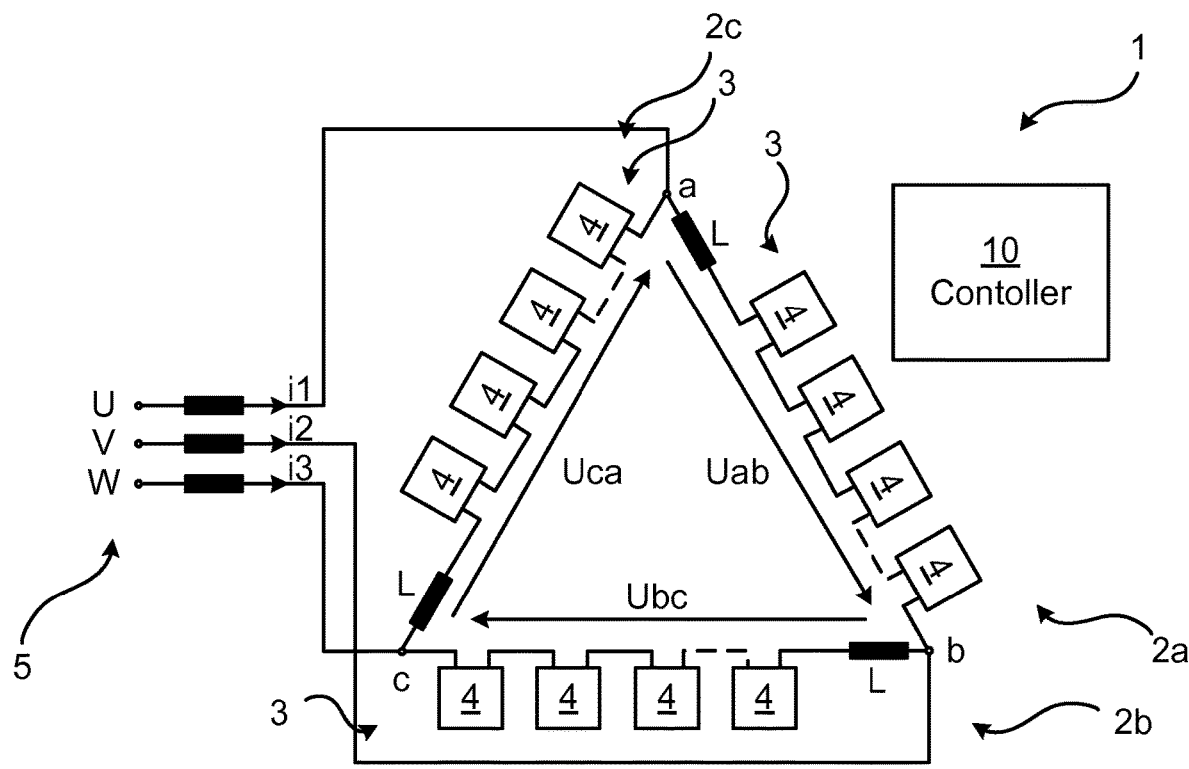
FIG. 2 is a schematic circuit diagram of an embodiment of an MMC in delta configuration, in accordance with the present invention.

The following description is focused on a Railway Intertie MMC (3-phase to 1-phase direct converter (See FIG. 1). But embodiments of the invention can easily be applied to other topologies such as for example:

Statcom in MMC delta topology (see FIG. 2).
Statcom in MMC star and/or double star topology.
3-phase to 3-phase MMC in direct and/or indirect topology (e.g. for pumped hydro applications).
HVDC applications.

FIG. 1 illustrates an embodiment of a 3-phase to 1-phase power converter 1 in double-wye (Y, star) configuration, e.g. in a railway intertie. The converter 1 is connected to and between two power grids 5, typically via respective transformers, a first power grid 5a which is here a 3-phase alternating current (AC) grid and a second power grid 5b which is here a single-phase AC grid e.g. for railway electrification. In some embodiments, a reactor may be used instead of transformer on the single-phase side, e.g. when feeding into a catenary wire grid 5b (e.g. 15 kV), while a transformer may be preferred on the single-phase side when feeding into a railway grid 5b (e.g. 110 kV). The MMC 1 comprises a plurality of phases 2, here a first phase 2a, a second phase 2b and a third phase 2c. Each phase 2 comprises at least one phase leg 3, here a first phase leg 3a and a second phase leg 3b. Each phase leg 3 comprises a plurality of series connected (also called cascaded or chain-linked) converter cells 4, as well as a phase leg reactor L. A control arrangement 10 may be comprised in the converter 1 for controlling the same, e.g. for performing an embodiment of the method of the present invention, as well as for setting references and sending firing pulses etc. The control arrangement 10 may e.g. comprise a central network controller as well as a local control unit for each cell 4.

FIG. 2 illustrates an embodiment of a STATCOM 1 in delta (Δ) configuration. The converter 1 is connected to a power grid 5, here a 3-phase AC grid, typically with phase reactors L series connected in each leg 3 in the delta configuration as shown in the figure, with line reactors (e.g. as shown between U and i1, V and i2, and W and i3, in the figure, being optional). As in the embodiment of FIG. 1, the power converter 1 comprises a plurality of phases 2, here a first phase 2a, a second phase 2b and a third phase 2c. Each phase 2 comprises a phase leg 3. Each phase leg 3 comprises a plurality of series connected (also called cascaded or chain-linked) converter cells 4. Again, a control arrangement 10 may be comprised in the converter 1 for controlling the same, e.g. for performing an embodiment of the method of the present invention, as well as for setting references and sending firing pulses etc. The control arrangement 10 may e.g. comprise a central network controller as well as a local control unit for each cell 4.

Figure 3:
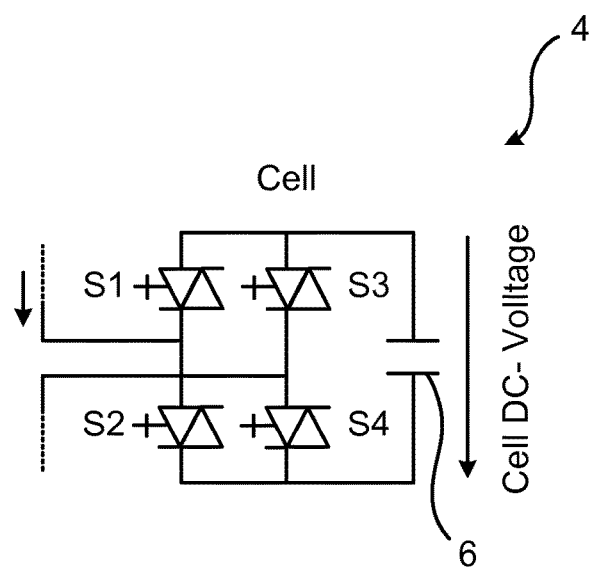
FIG. 3 is a schematic circuit diagram of an embodiment of a bipolar MMC cell, in accordance with the present invention.

FIG. 3 illustrates an embodiment of a converter cell 4. The cell 4 comprises an energy storage 6, e.g. in the form of a capacitor arrangement comprising at least one capacitor. The cell 4 also comprises a plurality of semiconductor switches S forming e.g. a half-bridge (also called monopolar) topology or a full-bridge (also called H-bridge or bipolar) topology. In the embodiment of FIG. 3, four semiconductor switches S1-S4 form a full-bridge topology. As indicated by the arrow by the energy storage 6, a cell direct current (DC) voltage is present over the energy storage 6 when the cell 4 is in use.

The nominal DC voltage of a phase leg 3 (i.e. the sum of all individual cell 4 DC voltages of the phase leg) is chosen in such a way that the converter 1 is able to run at maximum grid 5 voltage, e.g. maximum specified grid 5a voltage on the 3-phase side and simultaneously maximum grid 5b voltage on the 1-phase side for a railway intertie. Apart from that, some control margin is considered in the nominal DC voltage.

In accordance with the present invention, during grid failure and the resulting lower grid voltage, the required DC voltage of a phase leg is kept lower than in normal operation. At the time instant of the fault entry, the DC voltage may be reduced by a certain amount (e.g. by 10%).

Normally the active power is controlled on the 1-phase 5b side, that means that depending on the sign of the active power, the 1-phase side is injecting or withdrawing energy from the converter 1. The total stored converter energy has to be maintained at a constant value, that means that the average of all cell DC voltages has to be controlled to a constant value (nominal cell DC voltage). This is done by a DC voltage controller, typically comprised in the control arrangement 10 of the converter 1, whose output is the active current reference for the 3-phase side current controller. To reduce the DC voltage during a fault in a power grid 5 in accordance with the present invention, e.g. the first or second power grids 5a or 5b, typically the 1-phase power grid 5b, of FIG. 1, the reference value to the DC voltage controller is reduced accordingly (e.g. from 1 pu to 0.9 pu, i.e. by 10%).

During the whole fault, the DC voltage will be kept at the reduced value. At the time instant when the grid voltage recovers, the DC voltage will raise again fast. The difference is now that due to the earlier reduction in DC voltage, the cell DC voltages do not hit the overvoltage limit and the converter 1 stays in operation.

The same strategy may be applied for faults on the 3-phase grid 5a side, or any other power grid 5 side of an MMC.

Figure 4:
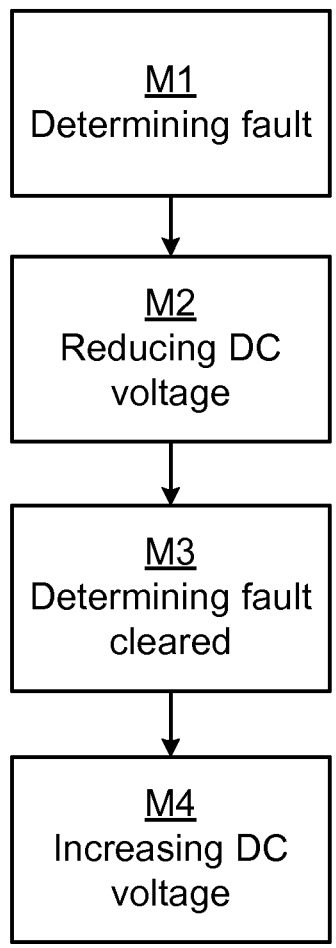
FIG. 4 is a schematic flow chart of an embodiment of a method of the present invention.

FIG. 4 illustrates an embodiment of a method of the present invention. The method is for controlling an MMC 1 during a fault in a power grid 5 to which the MMC is connected. The MMC comprises a plurality of phases 2, each phase comprising at least one phase leg 3. Each phase leg comprises a plurality of series connected converter cells 4. The method comprises determining M1 that a fault has occurred in the power grid 5, said fault including a reduced voltage in the power grid. The method also comprises, for each phase leg 3 of the MMC, reducing M2 the DC voltage of the phase leg by a predetermined amount from a nominal DC voltage to a reduced DC voltage, the DC voltage being the sum of all respective voltages over an energy storage 6 of each cell 4 of the phase leg. The DC voltage may be reduced e.g. immediately (in a single step), stepwise, by ramping and/or with a delay of a predetermined time period. The method also comprises determining M3 that the fault has been cleared, whereby the voltage in the power grid 5 is returned to nominal. The method also comprises, for each of the phase legs 3 of the MMC, increasing M4 the DC voltage back to the nominal DC voltage. The DC voltage may be increased e.g. immediately (in a single step), stepwise, by ramping and/or with a delay of a predetermined time period.

In some embodiments of the present invention, the predetermined amount with which the DC voltage is reduced is within the range of 5-20%, e.g. about 10%, of the nominal DC voltage.

In some embodiments of the present invention, the reducing M2 of the DC voltage includes updating a voltage reference for the phase leg 3, e.g. by a DC voltage controller of a control arrangement 10 of the converter 1.

In some embodiments of the present invention, the MMC 1 in in double-wye or delta configuration, e.g. as illustrated in FIG. 1 or 2. However, embodiments of the present invention may also be used with any other MMC topology, e.g. (single) wye.

In some embodiments of the present invention, the MMC (1) is configured for a railway intertie. However, a railway intertie is only an example and embodiments of the present invention may be useful also for any other converter application, e.g. STATCOM in delta topology (see FIG. 2), STATCOM in wye (star) and/or double wye (star) topology, 3-phase to 3-phase MMC in direct and/or indirect topology (e.g. for pumped hydro applications), or HVDC applications.

Embodiments of the method of the present invention may be performed by a control arrangement 10 of the MMC 1, which control arrangement comprises processing circuitry associated with a data storage. The processing circuitry may be equipped with one or more processing units CPU in the form of microprocessor(s) executing appropriate software stored in associated memory for procuring required functionality. However, other suitable devices with computing capabilities could be comprised in the processor, e.g. an application specific integrated circuit (ASIC), a field programmable gate array (FPGA), a complex programmable logic device (CPLD), etc., in order to control the MMC 1 and perform embodiments of the method of the present disclosure, while executing appropriate software, e.g. stored in a suitable data storage, such as a RAM, a Flash memory or a hard disk, or in the processing circuitry itself (as e.g. in case of an FPGA).

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the methods/processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), FPGA or any type of media or device suitable for storing instructions and/or data.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method of controlling a Modular Multilevel Converter (MMC) during a fault in a power grid to which the MMC is connected, the MMC comprising a plurality of phases, each phase comprising a plurality of phase legs, wherein each phase leg comprises a plurality of series connected converter cells, the method comprising:
   determining that the fault has occurred in the power grid, the fault including a reduced voltage in the power grid that is reduced from a nominal voltage in the power grid;
   for each phase leg of the MMC, reducing a DC voltage of the phase leg by a predetermined amount from a nominal DC voltage to a reduced DC voltage, the DC voltage of the phase leg being a sum of all respective voltages over an energy storage of each cell of the phase leg;
   determining that the fault has been cleared, whereby the reduced voltage in the power grid is returned to the nominal voltage in the power grid; and
   for each of the phase legs of the MMC, increasing the reduced DC voltage back to the nominal DC voltage.

2. The method of claim 1, wherein the predetermined amount is within a range of 5-20% of the nominal DC voltage.

3. The method of claim 1, wherein the reducing includes updating a voltage reference for each phase leg.

4. The method of claim 1, wherein the MMC is in double-wye configuration.

5. The method of claim 1, wherein the MMC is configured for a railway intertie.

6. A computer program product embodied on a non-transitory computer readable medium and comprising computer-executable components for causing a control arrangement of the MMC to perform the method of claim 1 when the computer-executable components are run on processing circuitry comprised in the control arrangement.

7. The method of claim 1, wherein the MMC is in delta configuration.

8. A control arrangement for controlling a Modular Multilevel Converter, MMC, during a fault in a power grid to which the MMC is connected, the MMC comprising a plurality of phases, each phase comprising at least one phase leg, wherein each phase leg comprises a plurality of series connected converter cells, the control arrangement comprising:

processing circuitry; and data storage storing instructions executable by the processing circuitry, whereby said control arrangement is operative to:

determine that the fault has occurred in the power grid, the fault including a reduced voltage in the power grid that is reduced from a nominal voltage in the power grid;

for each phase leg of the MMC, reduce a DC voltage of the phase leg by a predetermined amount from a nominal DC voltage to a reduced DC voltage, the DC voltage of the phase leg being a sum of all respective voltages over an energy storage of each cell of the phase leg;

determine that the fault has been cleared, whereby the reduced voltage in the power grid is returned to the nominal voltage of the power grid; and for each of the phase legs of the MMC, increase the reduced DC voltage back to the nominal DC voltage.

9. The control arrangement of claim 8, wherein the predetermined amount is within a range of 5-20% of the nominal DC voltage.

10. The control arrangement of claim 8, wherein the control arrangement is operative to reduce the DC voltage of the phase leg by the predetermined amount by updating a voltage reference for each phase leg.

11. The control arrangement of claim 8, wherein the MMC is in double-wye configuration.

12. The control arrangement of claim 8, wherein the MMC is in delta configuration.

13. The control arrangement of claim 8, wherein the MMC is configured for a railway intertie.

14. A method comprising:

operating a power grid at a nominal power grid voltage;

recognizing a fault by determining that the power grid is being operated at a reduced power grid voltage that is lower than the nominal power grid voltage;

in response to the fault, for each phase leg of a modular multilevel converter (MMC) that includes a plurality of phase legs, reducing a DC voltage of the phase leg by a predetermined amount from a nominal DC voltage to a reduced DC voltage, wherein each phase leg comprises a plurality of series connected converter cells and, for each phase leg, the DC voltage is a sum of all respective voltages over an energy storage of each cell of the phase leg;

after recognizing the fault, operating the power grid at the nominal power grid voltage;

recognizing that the fault has been cleared by determining that the power grid is being operated at the nominal power grid voltage; and in response to the fault being cleared, for each of the phase legs of the MMC, increasing the reduced DC voltage back to the nominal DC voltage.

15. The method of claim 14, wherein the predetermined amount is within a range of 5-20% of the nominal DC voltage.

16. The method of claim 14, wherein the reducing comprises updating a voltage reference for each phase leg.

17. The method of claim 14, wherein the MMC is in double-wye or delta configuration.

18. The method of claim 14, wherein the MMC is configured for a railway intertie.

19. A computer program product embodied on a non-transitory computer readable medium and comprising computer-executable components for causing a control arrangement of the MMC to perform method steps of the method of claim 14 when the computer-executable components are run on processing circuitry comprised in the control arrangement, the method steps including recognizing the fault, reducing the DC voltage of the phase leg, recognizing that the fault has been, and increasing the reduced DC voltage back to the nominal DC voltage.

20. A control arrangement for controlling the MMC of claim 14, the control arrangement including processing circuitry and data storage storing instructions executable by the processing circuitry to cause the processing circuit to perform method steps of the method when the instructions are executed by the processing circuitry, the method steps including recognizing the fault, reducing the DC voltage of the phase leg, recognizing that the fault has been, and increasing the reduced DC voltage back to the nominal DC voltage.

* * * * *